(12) United States Patent
Brannon

(10) Patent No.: US 6,257,083 B1
(45) Date of Patent: Jul. 10, 2001

(54) INFINITELY VARIABLE GEAR TRANSMISSION SYSTEM

(76) Inventor: Cecil R. Brannon, 1350 Schwede, Wentzville, MO (US) 63385

( * ) Notice: Subject to any disclaimer, the term of this patent is extended or adjusted under 35 U.S.C. 154(b) by 0 days.

(21) Appl. No.: 09/286,313

(22) Filed: Apr. 5, 1999

(51) Int. Cl.[7] ....................................................... F16H 3/22
(52) U.S. Cl. ............................................................ 74/349
(58) Field of Search ......................................... 74/349, 348

(56) References Cited

U.S. PATENT DOCUMENTS 1,883,355 * 10/1932 Edberg .
3,728,911 * 4/1973 Granville .
4,038,886 * 8/1977 Wittren .
4,805,488 * 2/1989 Sherman .

FOREIGN PATENT DOCUMENTS

2625740 * 12/1977 (DE) .
 898033 * 6/1962 (GB) .

* cited by examiner

*Primary Examiner*—Dirk Wright
(74) *Attorney, Agent, or Firm*—Henry W. Cummings

(57) ABSTRACT

An infinitely variable gear transmission system includes a pair of cones, one the driving cone and the other the driven cone, in which each have at their external surfaces a pair of gears which interact to transmit power from the driving gear to the driven gear, and where the means for controlling the speed of the driving gear and the driven the gear includes an accelerator linkage which causes the gears to move longitudinally back and forth relative to the rotating cones.

23 Claims, 7 Drawing Sheets

INFINITELY VARIABLE GEAR TRANSMISSION SYSTEM

I FIELD OF THE INVENTION

This invention relates to an infinitely variable gear transmission system and a method of making and using such a transmission system.

II BACKGROUND OF THE INVENTION

U.S. Pat. Nos. 1,883,355; 3,728,911; 4,038,886; 4,805,488; British Patent 898,033; and German Offenlegungsschrift Patent 26 25 740 (Copies attached in Application file) disclose infinitely variable gear transmissions.

However, none of these references disclose a variable gear transmission system in which a pair of cones, one the driving cone and the other the driven cone, have at their external surfaces, a pair of gears which interact to transmit power from the driving gear to the driven gear, and where the means for controlling the speed of the driving gear and the driven the gear comprises an accelerator linkage which causes the gears to move longitudinally back and forth relative to the rotating cones.

III SUMMARY OF THE INVENTION

A. Objects

One object of the present invention is to provide an improved infinitely variable gear transmission system.

Another object of the present invention is to provide an improved method of transmitting rotative power.

B. Summary

An infinitely variable gear transmission system includes a pair of cones, one the driving cone and the other the driven cone, in which each have at their external surfaces a pair of gears which interact to transmit power from the driving gear to the driven gear, and where the means for controlling the speed of the driving gear and the driven gear comprises an accelerator linkage which causes the gears to move longitudinally back and forth relative to the rotating cones.

IV THE DRAWINGS

Figure 1A:
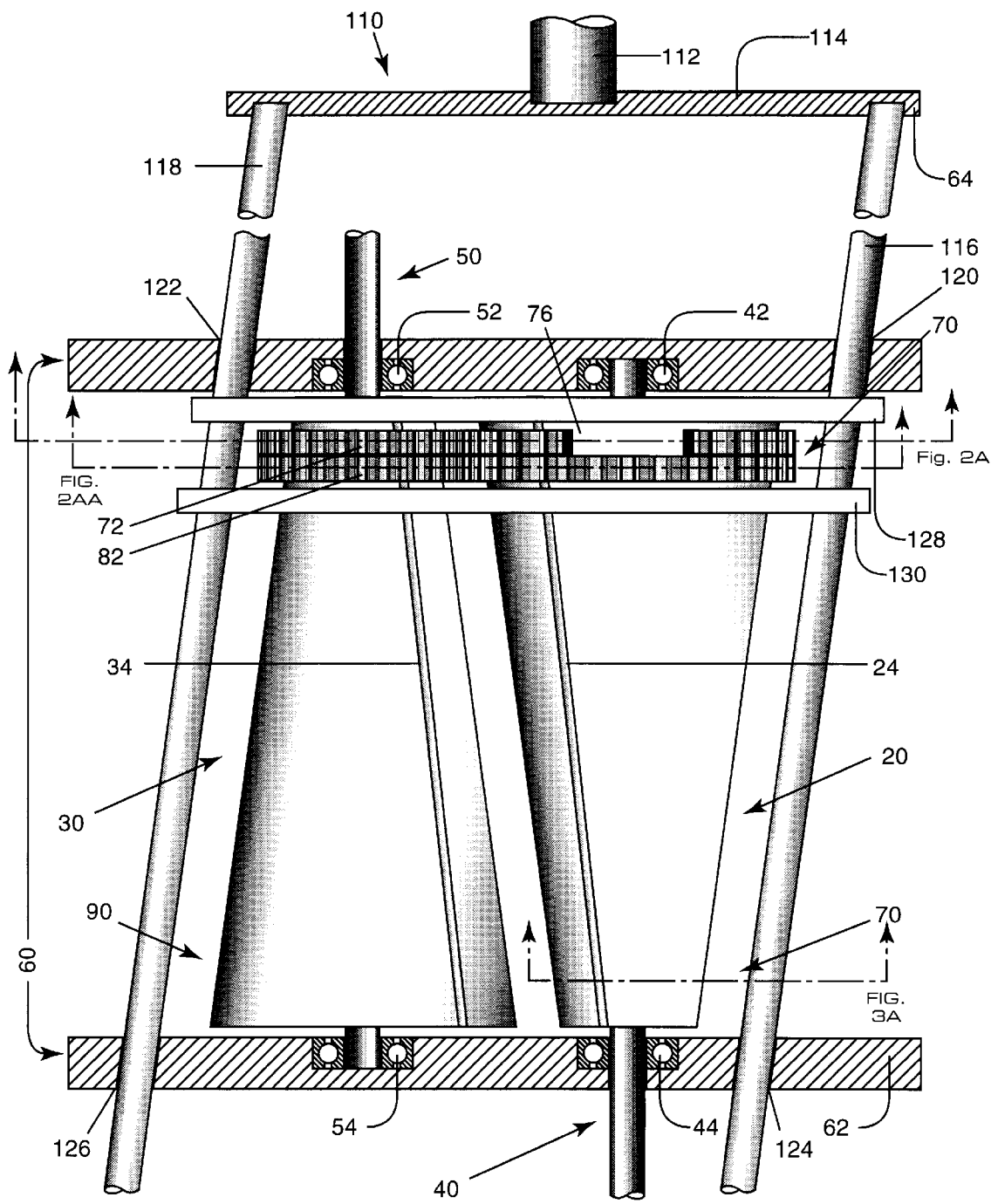
FIG. 1A is a plan view of the infinitely variable gear transmission system of the invention illustrating the gears in a low speed, high torque position.
Figure 2A:
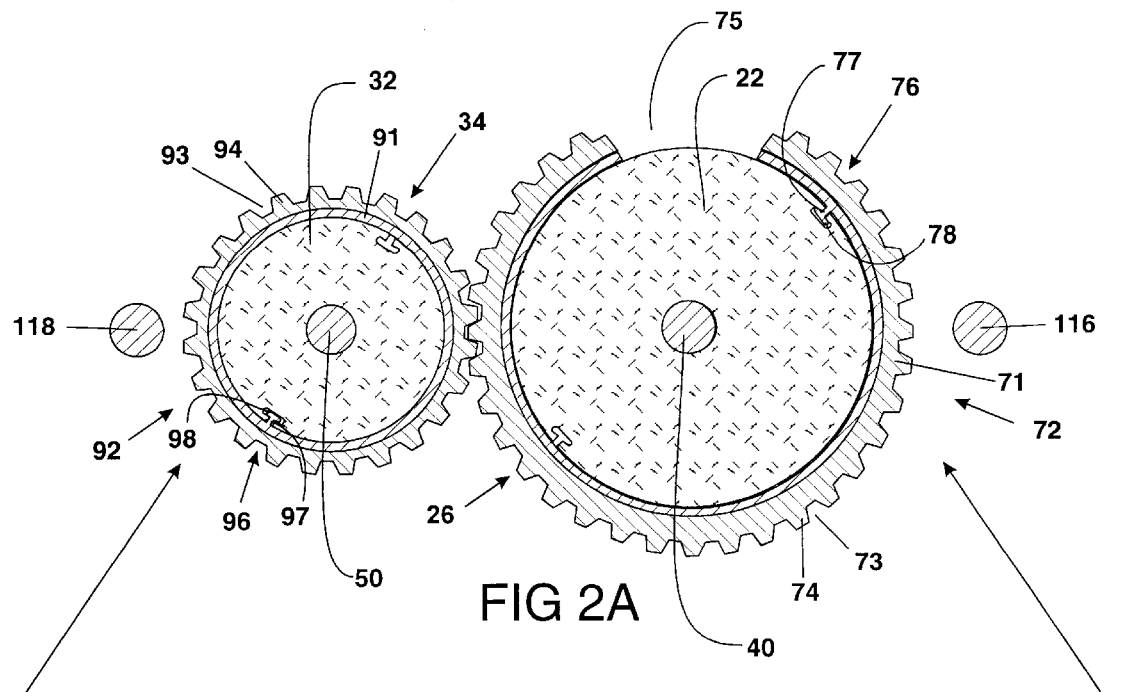
FIG. 2A is a sectional view looking in the direction of the arrows along the line 2A—2A in FIG. 1A.
Figure 2A:
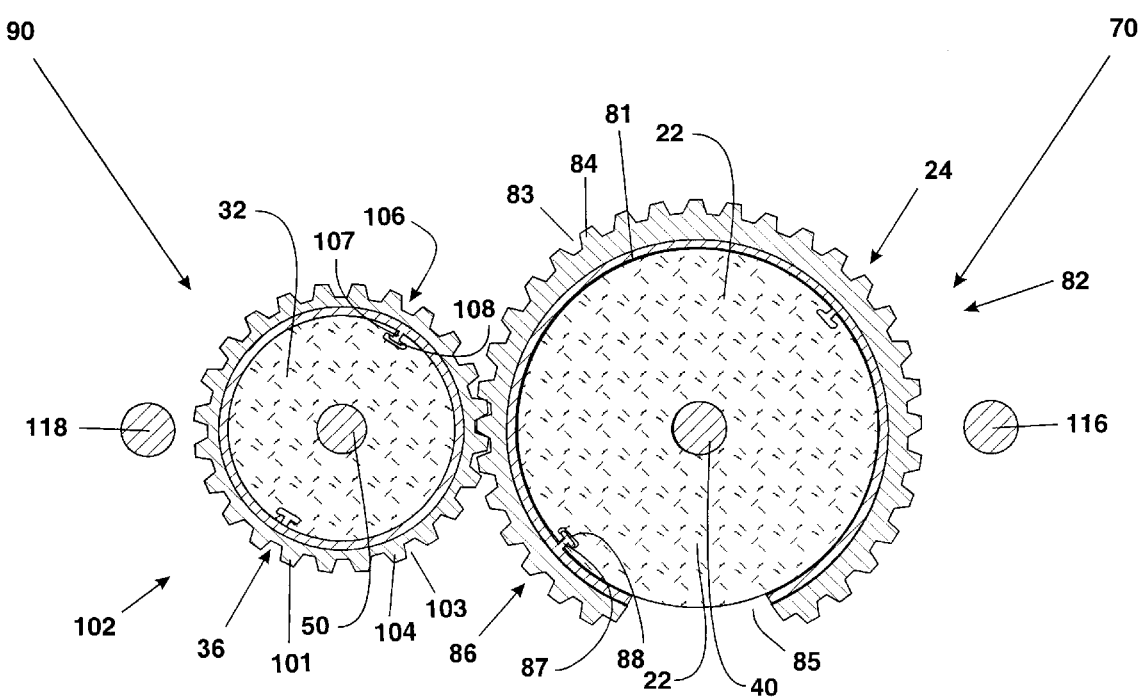

FIG. 2AA is a sectional view looking in the direction of the arrows along the line 2AA—2AA in FIG. 1A.

Figure 1B:
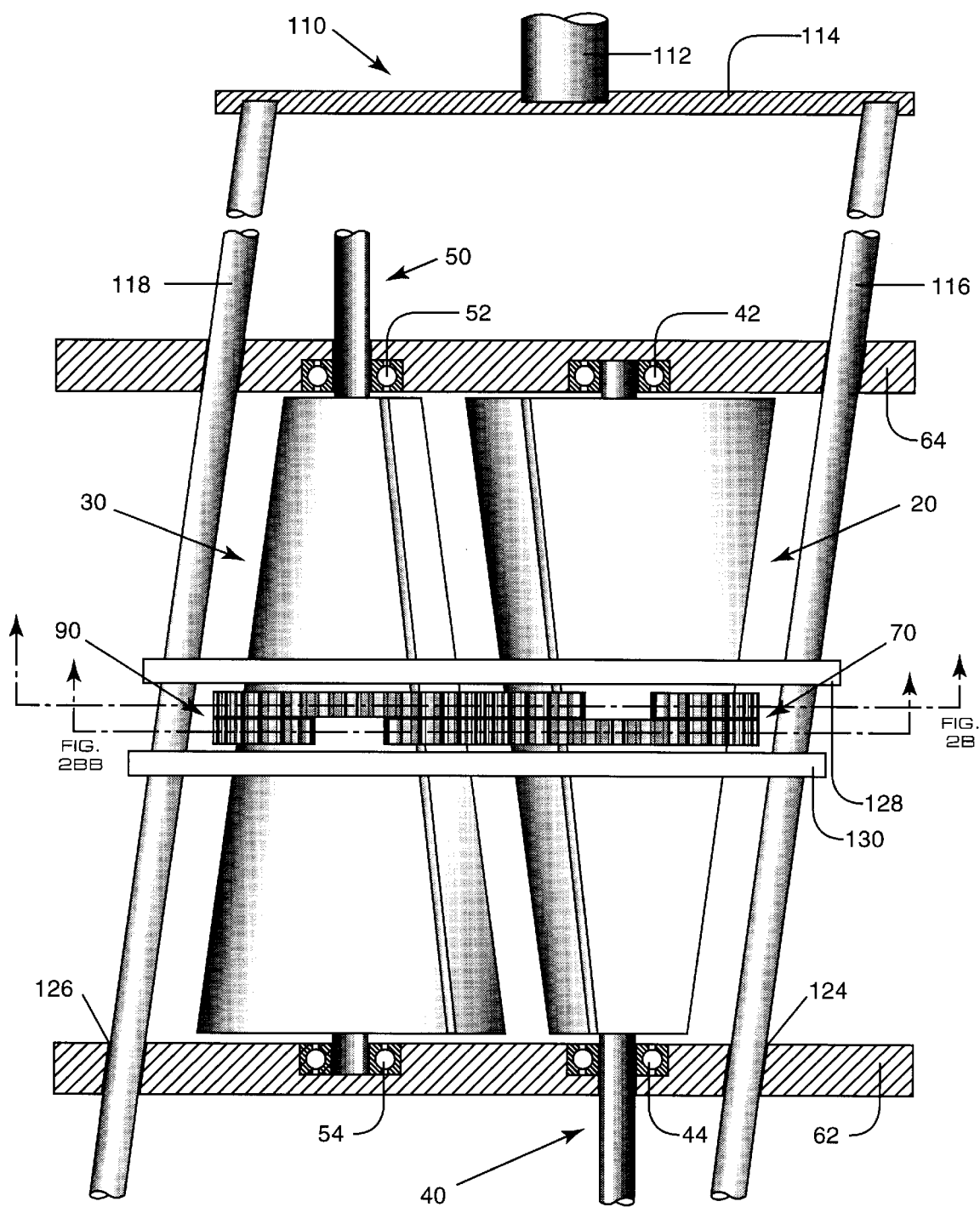
FIG. 1B is a plan view of the infinitely variable gear transmission system of the invention illustrating the gears in an intermediate position.
Figure 2B:
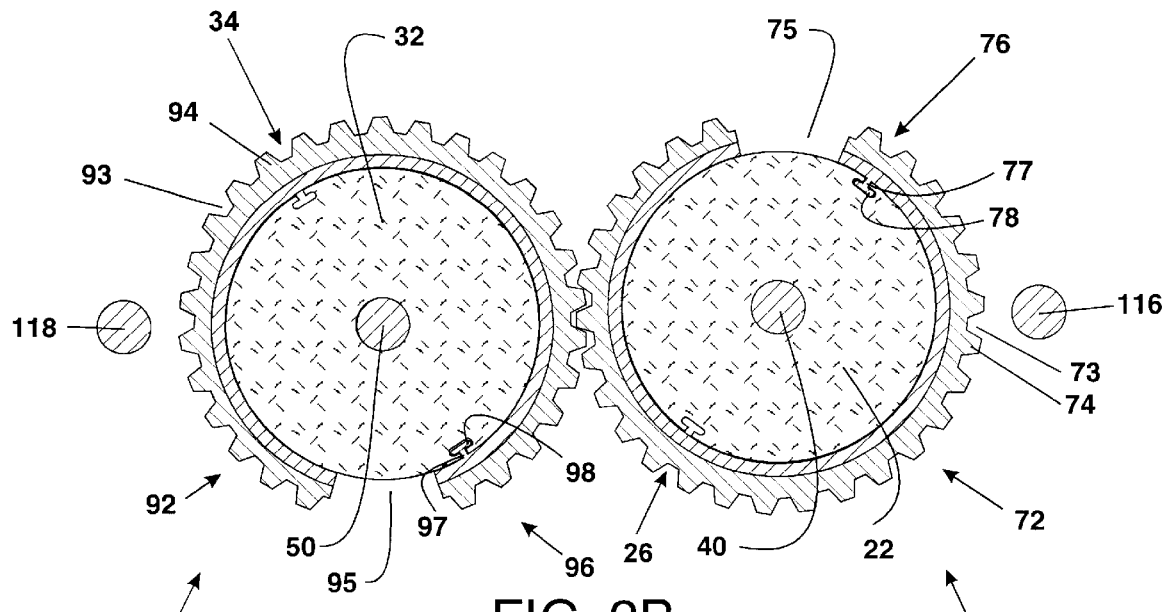
Figure 2B:
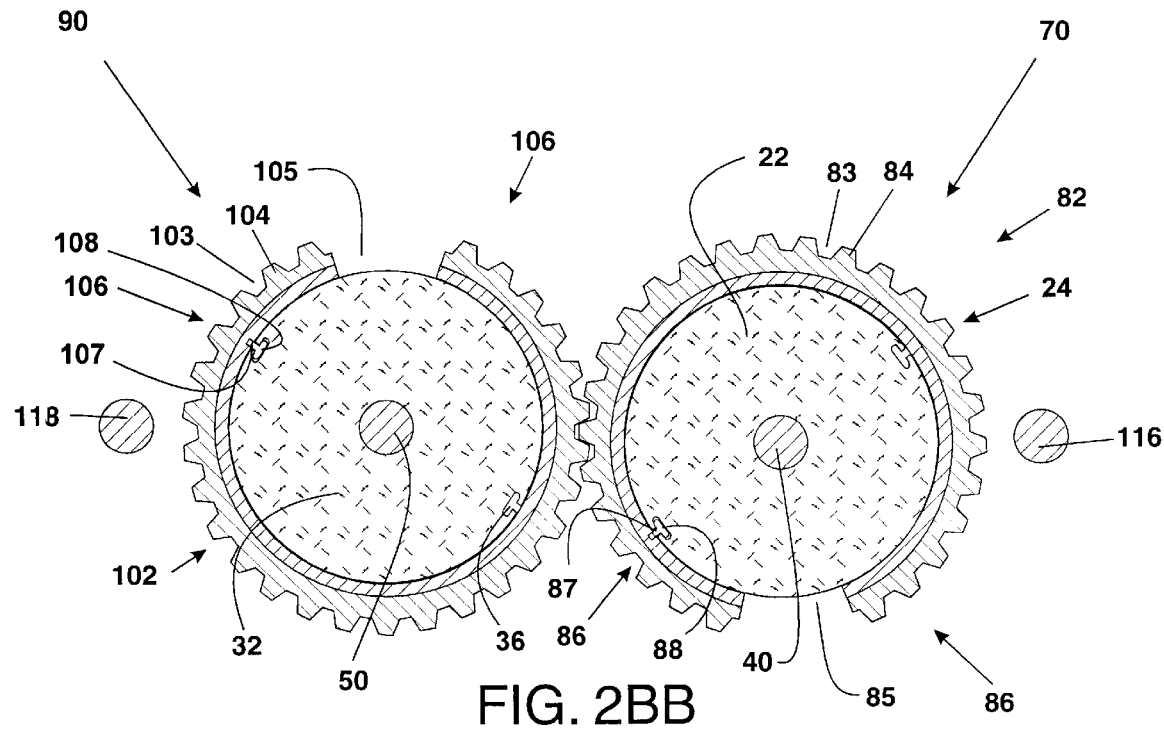

FIG. 2B is a sectional view looking in the direction of the arrows along the line 2B—2B in FIG. 1B.

FIG. 2BB is a sectional view looking in the direction of the arrows along the line 2BB—2BB in FIG. 1B.

Figure 1C:
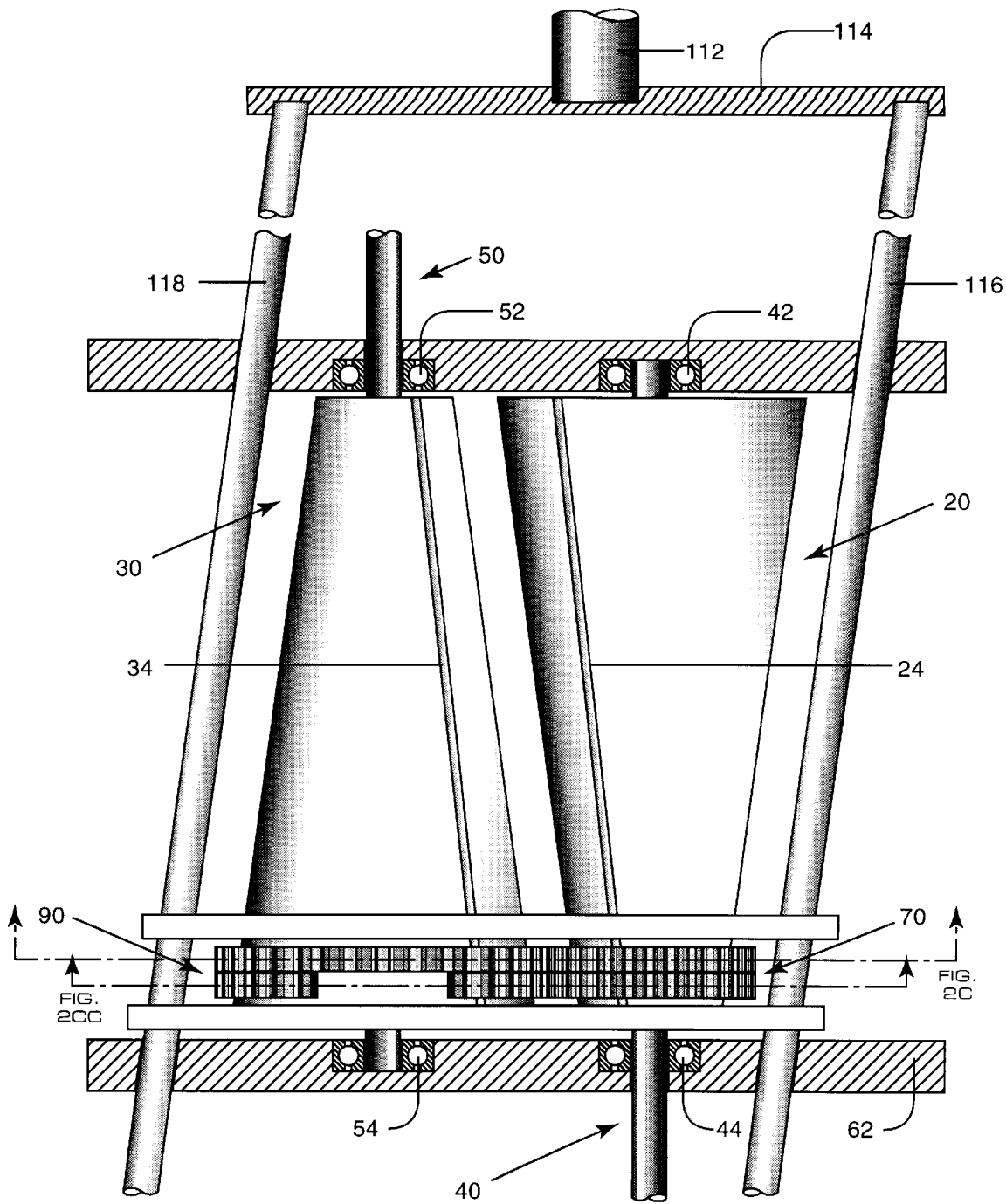
FIG. 1C is a plan view of the variable transmission system of the invention illustrating the gears in a high speed, low torque position.
Figure 2C:
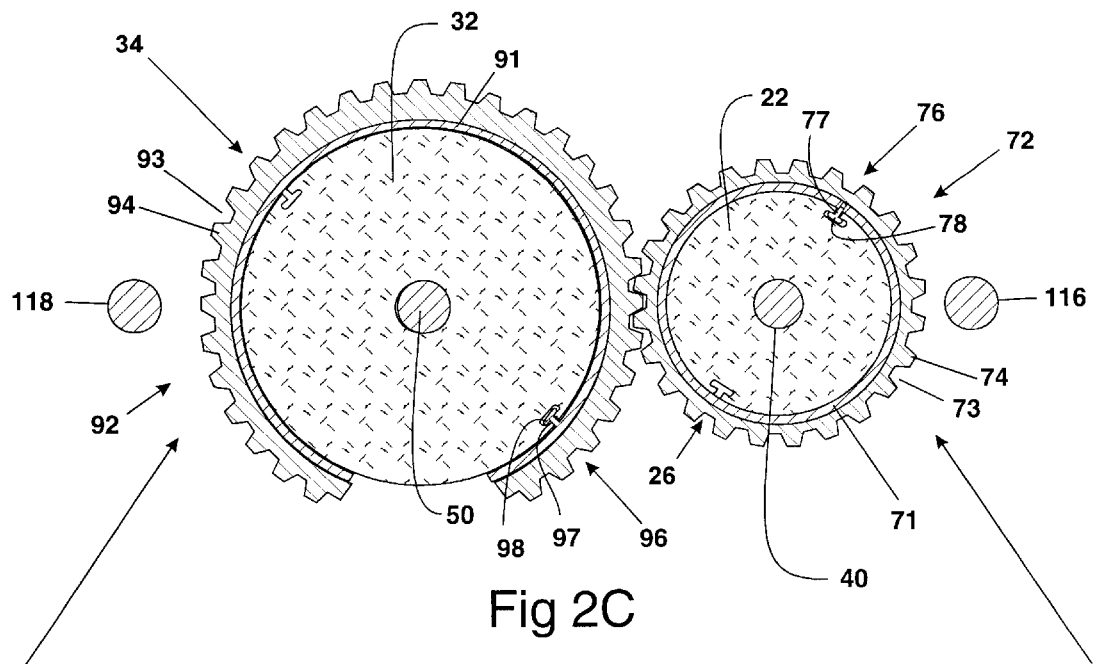
Figure 2C:
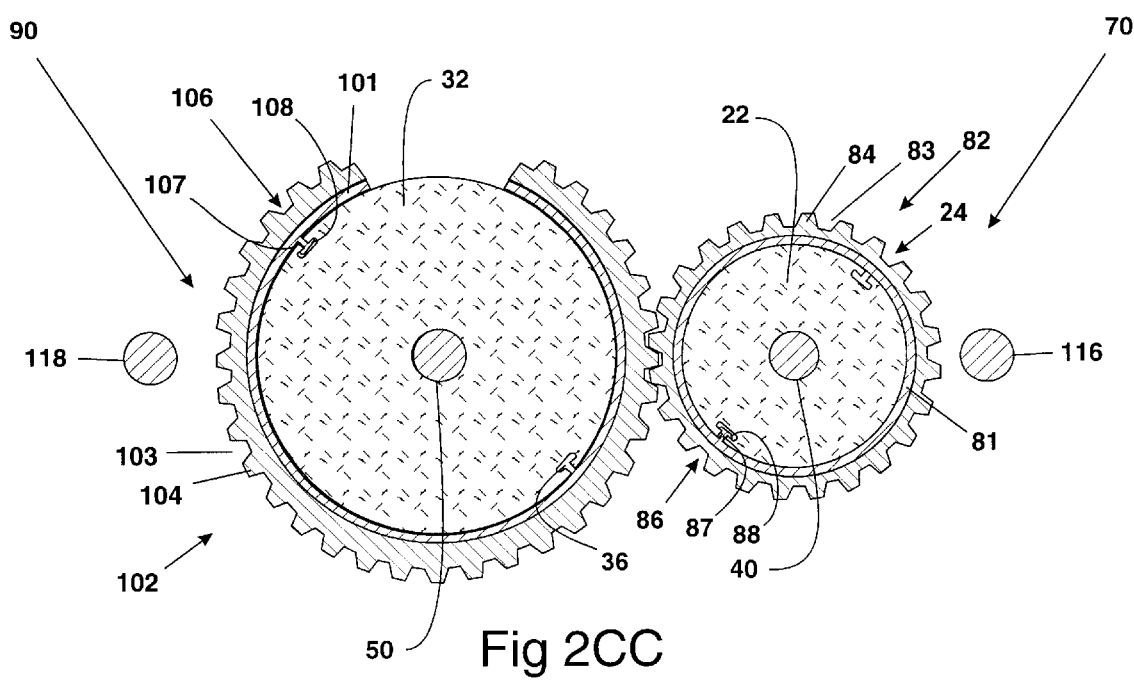

FIG. 2C is a sectional view looking in the direction of the arrows along the line 2C—2C in FIG. 1C.

FIG. 2CC is a sectional view looking in the direction of the arrows along the line 2CC—2CC in FIG. 1C.

Figure 3A:
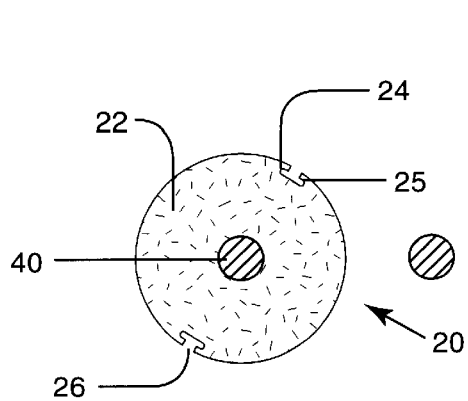
Figure 3:
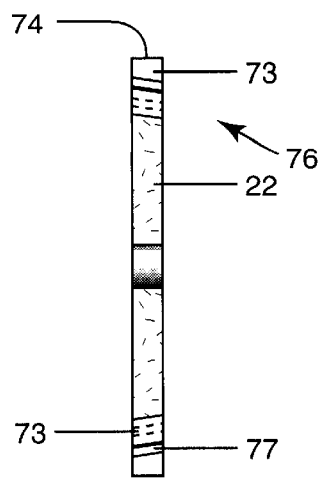

FIG. 3 is a detail view illustrating the slots in cone body portion 22.

FIG. 3A is a sectional view looking in the direction of the arrows along the line 3A—3A in FIG. 1A.

Figure 4:
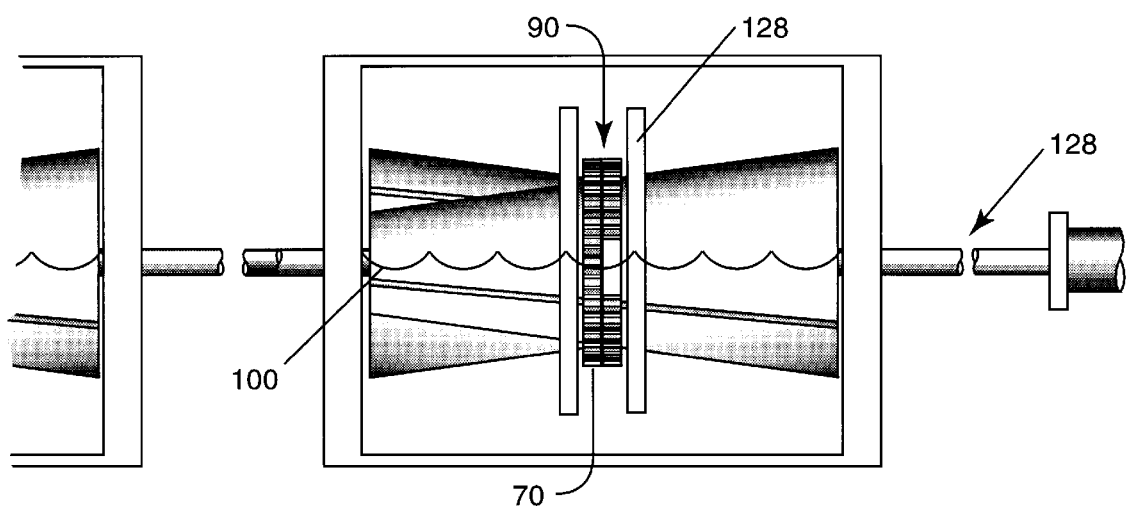

FIG. 4 is a schematic side view of the infinitely variable gear transmission system of the present invention illustrating a tandem infinitely variable gear transmission system.

Figure 4A:
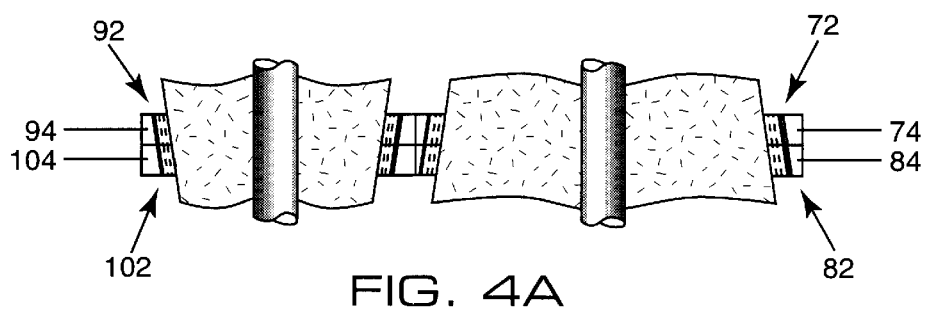

FIG. 4A is a sectional view looking in the direction of the arrows along the line 4A—4A in FIG. 2AA.

V DESCRIPTION OF PREFERRED EMBODIMENTS

The infinitely variable gear transmission system of present invention is indicated in drawings generally at 10. This system includes a driving cone 20 and driven cone 30, as illustrated in FIG. 1A. Cones 20 and 30 include respective body portions 22, 32 made of strong metal or plastic including but not limited to steel, heat treated aluminum alloy and/or reinforced plastic material.

Each of the cones has a large diameter at one end 21, 31 at one end and a smaller diameter at its respective other end 23, 33. The ratio of the large diamter end to the small diamter end is preferably from about 1.1/1 to about 5/1.

Cone body portion 22 is integrally connected to a drive shaft 40 by means of mechanical fasteners (not shown) or a shrink fit. The drive shaft passes through walls 62, 64 which are part of a housing 60, and through journal bearings 42 and 44.

As shown in FIG. 3A the cone body portion 22 includes slots 24 and 26 about 180 degrees apart. These slots extend the full length of cone 20 and include a first shank portion 25 and an enlarged internal head portion 27. Cone body portion 32 also includes a pair of slots 34 and 36 180 degrees apart including shank portions 35 and internal head portions 37 as indicated in FIG. 2C. The cone 30 is integrally connected to a driven shaft 50 by means of mechanical fasteners (not shown) or a shrink fit. The driven shaft passes through frame or housing walls 62, 64 and through journal bearings 42, 44.

Cone 20 has a surrounding gear system 70. Surrounding gear system 70 includes a first gear segment 72, and a second gear segment 82 adjacent, but spaced from segment 72. Both segments are generally circular and which can expand and contract to a limited extent. The gear segments 72 and 82 include gear teeth 74, 84; gear space 73, 83; and large expansion slots 75 and 85 which are spaced apart about 180 degrees as shown in FIGS. 2A and 2AA. The relative size of the teeth and slots is such that gear engagement will be maintained as the gears move longitudinally along cones 20 and 30, as the external diameters of the cones change during such longitudinal movement. See for example Toolmaker's Handbook; Miller & Russel Copyright 1981; Coles Publishing co. Toronto Canada pp 77–108 hereby incorporated into this application by this reference, including, but not limited to pp 77–108. The two segments each include T projections 76 and 86 with shank portions 77, 87 and enlarged head portions 78, 88 which extend into slots 24 and 26 in cone body portion 22.

Cone 30 has a surrounding gear system 90. Surrounding gear system 90 includes a first gear segment 92, and a second gear segment 102 adjacent, but spaced from segment 92. Both segments are generally circular and which can expand and contract to a limited extent. The gear segments 92 and 102 include gear teeth 94, 104 gear space 93, 103 and large expansion slots 95 and 105 which are spaced apart about 180 degrees as shown in FIGS. 2B and 2BB. The relative size of the teeth and slots is such that gear engagement will be maintained as the gears move longitudinally along cones 20 and 30, as the external diameters of the cones change during such longitudinal movement. See for example Toolmaker's Handbook; Miller & Russel, supra. The two segments each include T projections 96 and 106 with shank portions 97, 107 and enlarged head portions 98, 108 which extend into slots 34 and 36 in cone body portion 32.

Preferably, gear segments 72, 82, 92 and 102 include bushings 71, 81, 91, 101.

Gear segments 70 and 90 may be made of strong metal or plastic including but not limited to steel, heat treated aluminum alloy and/or reinforced plastic material. But the material should have sufficient ductility to allow the gear segments to expand and contract as they follow the contour of the cones 20 and 30. The gear teeth 74, 84, 94, 104 are preferably hardened for example by case hardening and/or induction hardening for increased wear. See Miller & Russel supra pp 340–356. Teflon (polytetrafluorethylene) or Teflon coated teeth, and slots and projections may also be used.

The thickness of the gear segments 72 is slightly less than the thickness of gear segments 92 and the thickness of gear sement 82 is slightly larger than gear segment 102 to adjust for the difference in cone diameter and maintain gear engagement. The difference in diameter depends on the diamters of the respective cones.

Furthermore, the gear systems 70 and 90 must be properly lubricated, for example by providing an oil bath 100 in the lower portion of the housing through which the segments pass during rotation to lubricate the engaging gear surfaces and the slots 24, 26, 34, 36, as the dovetail projections follow the slots in moving longitudinally back and forth along the cones 20 and 30, as shown schematically in FIG. 4.

Comparison of FIGS. 2A, 2AA; reveals that the slots 75 and 85 are located 180 degrees apart so that at all times torque will be transmitted from the drving cone 20 to the driven cone 30 through the gear system 72 or 82. During most of the time gears 72 and 82 will both transfer torque respectively to gear system 90 and 102. However in the brief period when the respective slots 75 and 85 reach gear teeth 94 and 104, torque will nonetheless be transferred through the operation of the other gear 72 or 82 engaging gear 92 or 102.

Comparing FIGS. 2A, 2AA to FIGS. 2B, 2BB reveals that the size of slots 75 and 85 have been reduced, and the gears 72 and 82 have reduced in diameter. Also in the gears 92 and 102 in FIGS. 2B. and 2BB significant gaps 95 and 105 are observable.

In FIGS. 2C and 2CC there is essentially no gap in gears 72 and 82, while a large gap 95, 105 appears in gears 92 and 102. However, nonetheless, in each situation torque is still transmitted during those relatively infrequent periods when the gap in one of the driven gears 95, 105 is adjacent one the driving gears 72, 82 because the other driving gear will be engaging its respective driven gear 92, 102, keeping all gears in synchronization.

An acceleration and decceleration system is illustrated in FIGS. 1A through 1C at 110. This system includes an accelerator linkage 112, which may be manual or automatic, and which is integrally connected to an accelerator plate 114 by welding or with mechanical fasteners (not shown). This plate is connected by welding or mechanical fasteners (not shown) to a pair of longitudinally extending accelerator arms 116 and 118 which extend to and pass through openings 120 and 122 in the housing plate 64 and through openings 124 and 126 in housing plate 62.

A pair of transverse plates 128, 130 are integrally connected to accelerator arms 116 and 118 by welding or with mechanical fasteners (not shown). The transverse plates move the gear segments 70 and 90 longitudinally relative to the comes 20 and 30 to accelerate or decelerate the output shaft 50.

In operation, FIG. 1A shows the system in a low speed and a high torque mode of operation in which the drive shaft 40 and cone 20 at the large diameter end is rotated at a relatively low R.P.M. and is transmitting high torque through the gear system 70 to the gear system 90 and to output shaft 50. FIG. 1B shows the system at an intermediate rate of speed where the cone 20 driven by the drive shaft 40 is rotating at a greater R.P.M., but with less torque transferred from the gear segments 70 to the gear segments 90. FIG. 1C shows the system at a high rate of rotation of the cone 20 when the gear segment system 70 drives the cone 30 and its gears system 90 at relatively high rate of speed but with low torque transferred.

FIG. 4 shows a tandem mode of operation where the output from shaft 50 is the input drive shaft 140 in a second infinitely variable gear transmission unit 200 in order to further change the gear ratio in applications where a large change in gear ratio is required. It will be apparent to those skilled in the art that as many tandem units may be used as are necessary to obtain the gear ratio needed for the entire system.

What is claimed is:

1. An infinitely variable gear transmission system comprising:

first and second cones extending longitudinally and located adjacent one another;

each of said first and second cones having a large diameter end and a small diameter end;

the large diameter end of said first cone being located adjacent said small diameter end of said second cone; and said small diameter end of the first cone being located adjacent said large diameter end of said second cone;

means for connecting one of said first and second cones to a drive shaft;

means for connecting the other of said first and second cones to a driven shaft;

said first cone having located at its external periphery a first gear system comprising a first gear segment of generally circular shape including gear teeth and gear spaces;

said first gear segment having a first slot located in its external periphery; and a second gear segment longitudinally spaced from said first gear segment; said second gear segment being of generally circular shape and containing gear teeth and gear spaces;

said second gear segment having a second slot located in its external periphery;

said first and a second slots located approximately 180 degrees apart;

said second cone having located at its external periphery a second gear system comprising a third gear segment of generally circular shape including gear teeth and gear spaces;

said third gear segment having a third slot located in its external periphery; and a fourth gear segment longitudinally spaced from said third gear segment; said fourth gear segment being generally and containing gear teeth and gear spaces;

said fourth gear segment having a fourth slot located in its external periphery;

said third and said fourth slots being located approximately 180 degrees apart;

means for moving said first gear system and said second gear system longitudinally relative to said first and second cones to vary the rate of rotation of said driven shaft with respect to said driving shaft;

said first, second, third, and fourth gear segments being made of a material of sufficient ductility to expand and contract as said first gear system and said second gear system longitudinally relative to said first and second cones.

2. An infinitely variable gear transmission system according to claim 1 wherein said means for moving said first gear system and said second gear system longitudinally relative to said first and second cones comprises first and second slots in each of said first and second cones and protections on said first, second third, and fourth gear segments which extend into and follow said respective slots in said first and second cones.

3. An infinitely variable gear transmission system according to claim 2 wherein said means for moving said first gear system and said second gear system longitudinally relative to said first and second cones comprises at least linkage which engages at least one of said first, second, third and fourth gear segments.

4. An infinitely variable gear transmission system according to claim 2 wherein said transmission includes a transmission housing, and said first and second pair of cones are mounted within said transmission housing.

5. An infinitely variable gear transmission system according to claim 2 wherein said gear segment projections and said cone slots each include respective shank portions and enlarged engagement portions.

6. An infinitely variable gear transmission system according to claim 5 wherein said gear segment projections and said cone slots are dovetail in shape.

7. An infinitely variable gear transmission system according to claim 4 wherein said housing includes bearings and said drive shaft and said driven shaft extend into said bearings.

8. An infinitely variable gear transmission system according to claim 3 wherein said housing includes means for receiving said linkage.

9. An infinitely variable gear transmission system according to claim 8 wherein said linkage includes laterally spaced arms located on opposite sides of said cones.

10. An infinitely variable gear transmission system according to claim 9 wherein said linkage includes at least one transverse link attached to at least one of said lateraly spaced arms.

11. An infinitely variable gear transmission system according to claim 9 wherein said linkage includes a pair of transverse members attached to both of said laterally spaced arms.

12. An infinitely variable gear transmission system according to claim 1 including means for lubricating said first and second gear systems.

13. An infinitely variable gear transmission system according to claim 12 wherein said first and second gear systems comprise bearing means and wherein said means for lubricating comprises means for placing lubricating fluid in contact with said first and second gear systems and said bearing means.

14. An infinitely variable gear transmission system according to claim 12 wherein the means for lubricating comprises coating material on one or more of said said first, seond, third and fourth gear segments.

15. A method of transferring rotative power with an infinitely variable gear transmission system comprising:

proving first and second cones extending longitudinally and located adjacent one another;

forming on each of said first and scond cones a large diameter end and a small diameter end;

locating the large diameter end of said first cone being located adjacent said small diameter end of said second cone; locating said small diameter end of the first cone being located adjacent said large diameter end of said second cone;

connecting one of said first and second cones to a drive shaft;

connecting the other of said first and second cones to a driven shaft;

locating on the external periphery of said first cone a first gear system comprising a first gear segment of generally circular shape including gear teeth and gear spaces;

forming a first slot on said first gear segment in its external periphery;

locating a second gear segment longitudinally spaced from said first gear segment; said second gear segment being of generally circular shape and containing gear teeth and gear spaces;

forming a second slot in said second gear segment in its external periphery;

locating said first and a second slots approximately 180 degrees apart;

locating at the external periphery of said second cone a second gear system comprising a third gear segment of generally circular shape including gear teeth and gear spaces;

locating in said third gear segment a third slot located in its external periphery;

locating a fourth gear segment longitudinally spaced from said third gear segment; said fourth gear segment being generally and containing gear teeth and gear spaces;

forming in said fourth gear segment a fourth slot in its external periphery;

locating said third and said fourth slots approximately 180 degrees apart;

moving said first gear system and said second gear system longitudinally relative to said first and second cones to vary the rate of rotation of said driven shaft with respect to said driving shaft; and forming said first, second, third, and fourth gear segments from a material of sufficient ductility to expand and contract as said first gear system and said second gear system longitudinally relative to said first and second cones.

16. A method according to claim 15 comprising forming first and second slots in each of said first and second cones and forming protections on said first, second, third, and fourth gear segments and locating said projections within said respective slots in said first and second cones.

17. A method according to claim 15 including hardening said gear teeth on said first, second, third, and fourth gear segments.

18. A method according to claim 17 including hardening said gear teeth by case hardening.

19. A method according to claim 17 including hardening said gear teeth by induction hardening.

20. A method according to claim 1 including lubricating said first, second, third, and fourth gear segemts.

21. An infinitely variable gear transmission system comprising:

a pair of cones, one the driving cone and the other the driven cone, in which each have at their external surfaces a pair of gears which interact to transmit power from a driving gear to the driven gear; and means for controlling the speed of the driving gear and the driven gear comprising an accelerator-decelerator linkage which causes said gears to move longitudinally back and forth relative to said rotating cones.

22. An infinitely variable gear transmission system according to claim 1 wherein the thickness of said first and fourth gear segments is less than the diameter of said second and third gear segments to adjust for difference in cone diameter and maintain gear engagement.

23. An infinitely variable gear transmission system according to claim 2 wherein the thickness of said first and fourth segments is less than the diameter of said second and third segments to adjust for difference in cone diameter and maintain gear engagement.

\* \* \* \* \*